United States Patent
Rho

(10) Patent No.: US 7,190,975 B2
(45) Date of Patent: Mar. 13, 2007

(54) SPEED DIALING METHOD IN MOBILE PHONE

(75) Inventor: Seung-Mun Rho, Daegu-kwangyeokshi (KR)

(73) Assignee: Samsung Electronics Co., Ltd. (KR)

( * ) Notice: Subject to any disclaimer, the term of this patent is extended or adjusted under 35 U.S.C. 154(b) by 767 days.

(21) Appl. No.: 09/956,649

(22) Filed: Sep. 20, 2001

(65) Prior Publication Data

US 2002/0107050 A1    Aug. 8, 2002

(30) Foreign Application Priority Data

Feb. 8, 2001    (KR) .................................. 2001-6221

(51) Int. Cl.
*H04M 1/00*    (2006.01)

(52) U.S. Cl. ...................... 455/564; 455/566; 455/460

(58) Field of Classification Search ................ 455/569, 455/564, 566, 456.6, 460, 550.1, 556.2, 557, 455/558; 379/216.01, 354, 315.01, 93.23
See application file for complete search history.

(56) References Cited

U.S. PATENT DOCUMENTS

| | | | | |
|---|---|---|---|---|
| 5,568,546 A | * | 10/1996 | Marutiak | 379/355.05 |
| 5,943,055 A | * | 8/1999 | Sylvan | 715/839 |
| 6,781,575 B1 | * | 8/2004 | Hawkins et al. | 345/173 |

FOREIGN PATENT DOCUMENTS

| | | | | |
|---|---|---|---|---|
| EP | 721272 A2 | * | 7/1996 | |
| EP | 930761 A2 | * | 7/1999 | |
| JP | 363187850 A | * | 8/1988 | |

* cited by examiner

*Primary Examiner*—Melur Ramakrishnaiah
(74) *Attorney, Agent, or Firm*—The Farrell Law Firm

(57) ABSTRACT

There is provided a speed dialing method in a mobile phone where a plurality of phone numbers are stored at a designated address in a memory. The plurality of phone numbers at the designated address are displayed to a user upon input of a speed dialing key corresponding to the designated address, and if the user selects one of the displayed phone numbers, the selected phone number is speedily dialed.

12 Claims, 11 Drawing Sheets

| ADDRESS | PHONE NUMBER | |
|---|---|---|
| 1 | HOME, <br> OFFICE, <br> HP, | 054-479-5694 <br> 02-797-3501 <br> 011-9830-8568 |
| 2 | TOM, <br> BILL, <br> BOB, <br> JERRY, | 011-833-5217 <br> 016-4594-3029 <br> 011-359-9565 <br> 02-232-5449 |
| 3 | JAMES BROWN, | 011-537-5790 |
| 4 | ELDEST BROTHER <br> ELDER BROTHER | 017-612-6265 <br> 019-410-2085 |
| 5 | | |

FIG. 3

SPEED DIALING METHOD IN MOBILE PHONE

PRIORITY

This application claims priority to an application entitled "Speed Dialing Method in Mobile Phone" filed in the Korean Industrial Property Office on Feb. 8, 2001 and assigned Serial No. 2001-6221, the contents of which are hereby incorporated by reference.

BACKGROUND OF THE INVENTION

1. Field of the Invention

The present invention relates generally to a mobile phone, and in particular, to a method for speed dialing in a mobile phone.

2. Description of the Related Art

A speed dialing function can be carried out with a mobile phone in use with an increasing demand as well as with a wired/wireless phone for home use. For speed dialing, one phone number is assigned at each address in the mobile phone.

More specifically, at least one frequently used phone number is stored at a designated address in the mobile phone. When a user presses a hot key (generally a digit button) corresponding to the address, the corresponding phone number is speedily dialed.

According to the above speed dialing function, however, even if a plurality of phone numbers are stored at each address, only one designated phone number is speedily dialed. Therefore, speed dialing is not available for call origination to the other undesignated phone numbers.

SUMMARY OF THE INVENTION

An object of the present invention is, therefore, to provide an improved speed dialing method for a mobile phone that can store a plurality of phone numbers as each address.

Another object of the present invention is to provide an improved speed dialing method for a mobile phone that arranges a plurality of phone numbers stored at each address as a user requests and displays the plurality of phone numbers.

A further object of the present invention is to provide a method of automatically transitioning to a phone number edit mode during speed dialing in a mobile phone that can store a plurality of phone numbers as each address.

The foregoing and other objects are achieved by a speed dialing method in a mobile phone where a plurality of phone numbers are stored at a designated address in a memory. The plurality of phone numbers at the designated address are displayed to a user upon input of a speed dialing key corresponding to the designated address, and if the user selects one of the displayed phone numbers, the selected phone number is speedily dialed.

BRIEF DESCRIPTION OF THE DRAWINGS

The above and other objects, features and advantages of the present invention will become more apparent from the following detailed description when taken in conjunction with the accompanying drawings in which:

FIG. 3 illustrates an address table having phone numbers stored at a corresponding address in the mobile phone according to the present invention;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
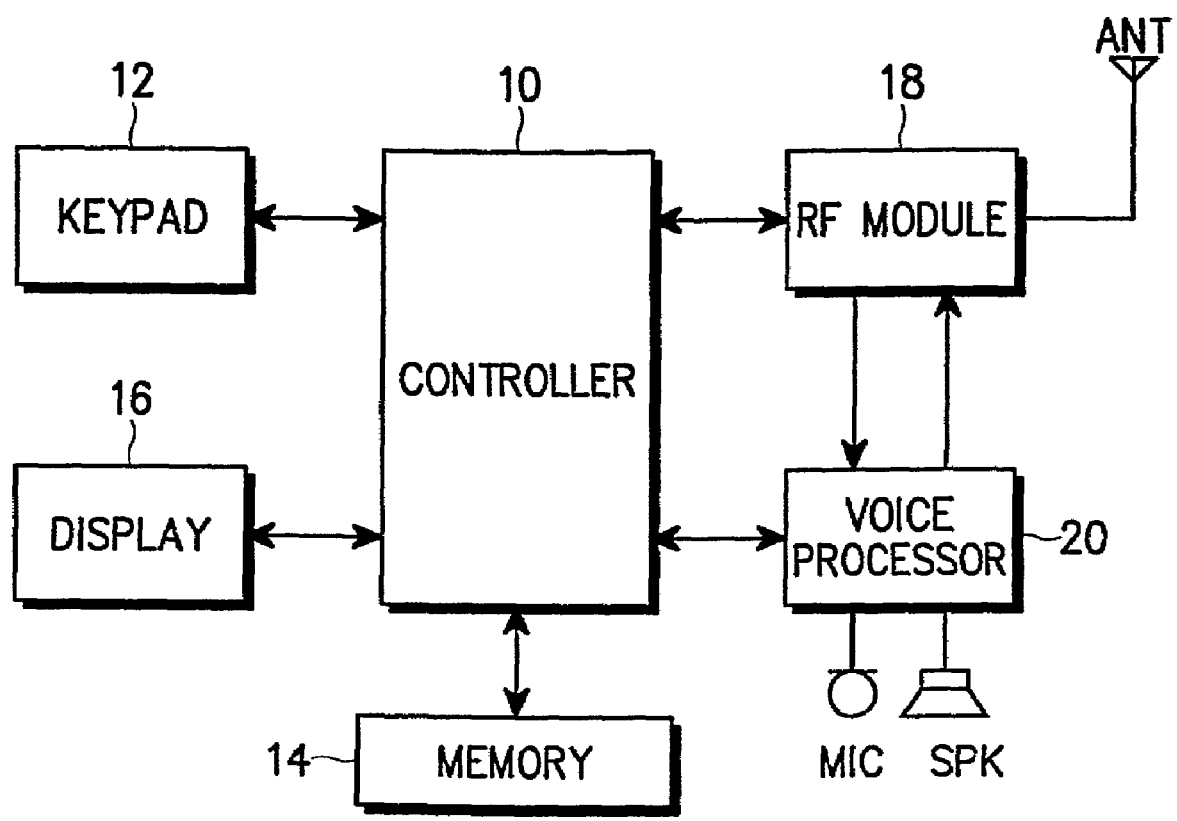
FIG. 1 is a block diagram of a mobile phone to which the present invention is applied.

FIG. 1 is a block diagram of a mobile phone to which the present invention is applied.

Referring to FIG. 1, a controller 10 provides overall control to the operation of the mobile phone by a control program stored in a memory 14. In particular, the controller 10 recognizes input of a speed dialing key, determines whether phone numbers exist at a designated address in the memory 14, displays them if they do, and controls selection of a phone number and call origination to the phone number according to the present invention. The controller 10 also controls arrangement and storage of a phone number list including serviced phone numbers in a phone number list arrangement and storage mode (hereinafter, referred to as a list arrangement and storage mode). Furthermore, the controller 10 controls editing of phone numbers stored together with a phone number to be speedily dialed at the same address.

Meanwhile, the memory 14 includes a program memory for storing program data needed to control the operation of the mobile phone and a data memory for storing data generated during a control operation or user-generated data.

According to the present invention, the memory 14 has storage areas with addresses for storing a plurality of phone numbers to be speedily dialed. If a user sets the list arrangement and storage mode, the memory 14 arranges a plurality of phone numbers and stores them in a storage area corresponding to a designated address in the list arrangement and storage mode. If the user transitions from the list arrangement and storage mode to a phone number edit mode, the memory 14 updates the phone numbers after amendment.

A keypad 12 includes a plurality of digit buttons and function buttons to dial phone numbers and generates key data corresponding to key input. A display 16, which can be an LCD (Liquid Crystal Display), displays messages in association with the operational status of the mobile phone under the control of the controller 10. The display 16 includes an LED (Light mission Diode) (not shown) to notify the user of reception and transmission of a radio communication signal visibly. An RF (Radio Frequency) module 18 transmits data received from the controller 10 as a radio signal through an antenna ANT after modulation and frequency conversion, and separates a signal from a radio signal received through the antenna ANT and feeds it after frequency conversion and demodulation. A voice processor 20 digitizes voice received from a microphone MIC, demodulates voice data received from the RF module 18, and outputs the demodulated voice data via a speaker SPK, under the control of the controller 10.

Figure 2:
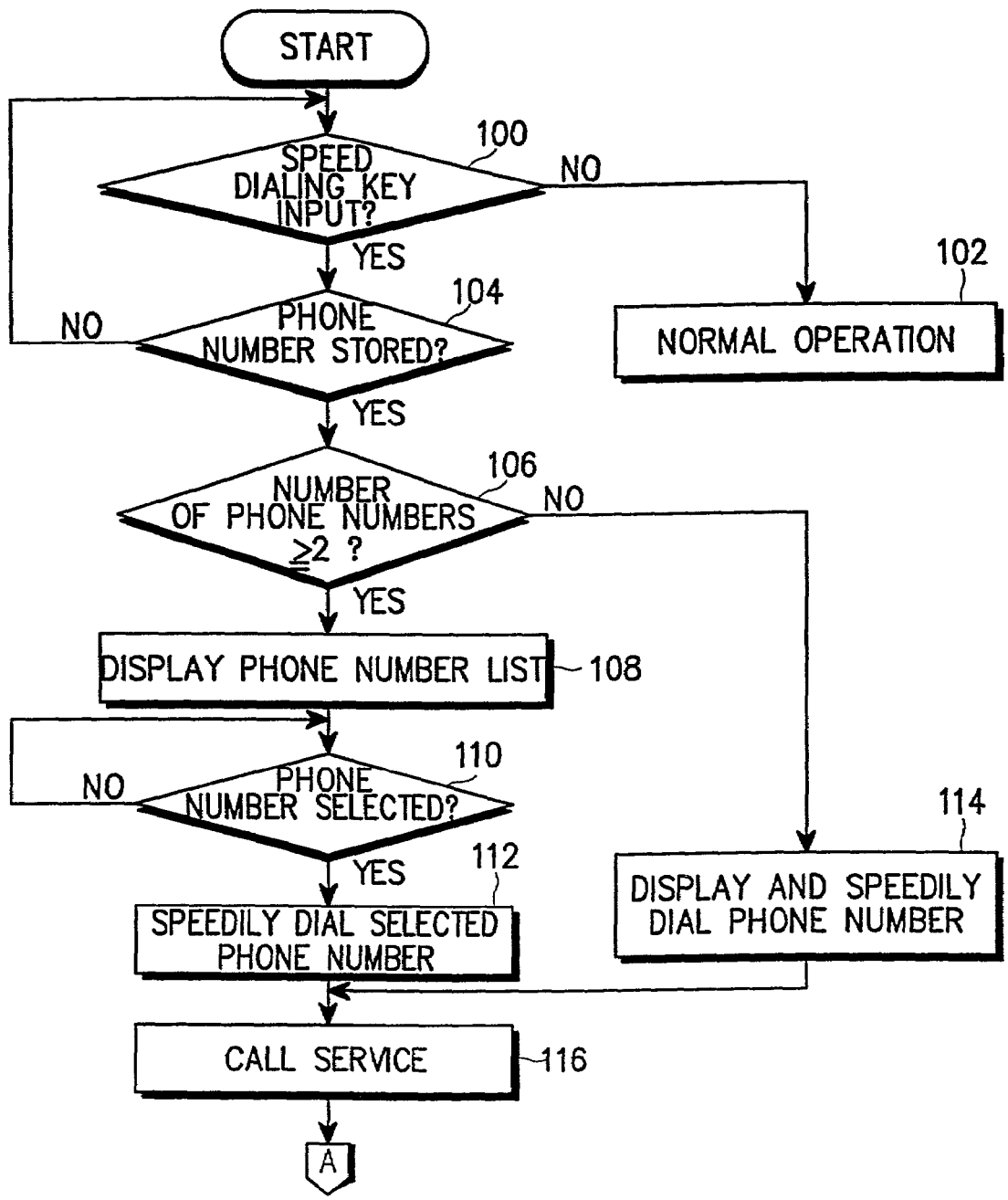
FIG. 2 is a flowchart illustrating a control operation for speed dialing according to an embodiment of the present invention.
Figure 10:
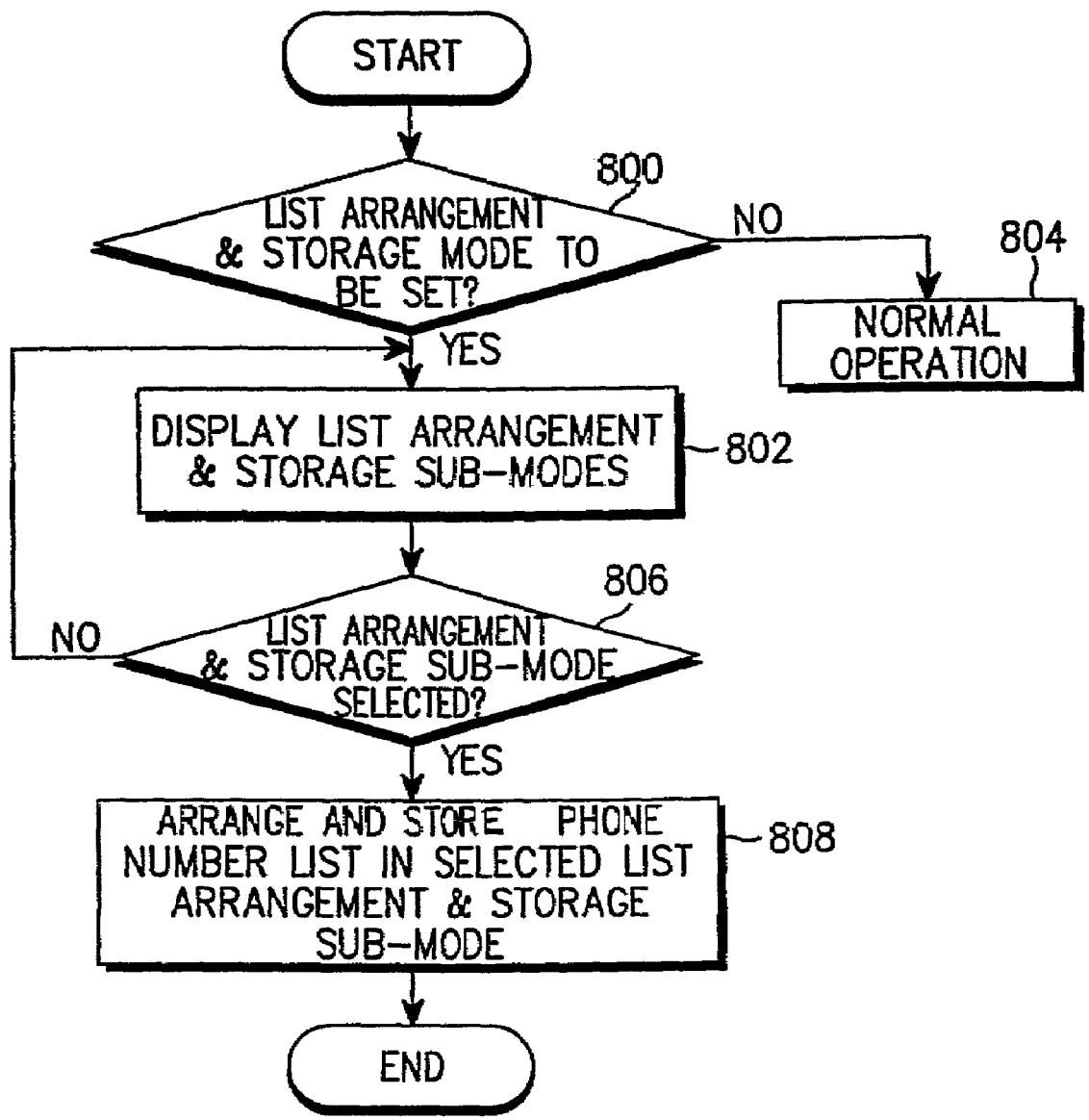
FIG. 10 is a flowchart illustrating a control operation for setting a phone number list arrangement and storage mode according to the present invention.
Figure 11:
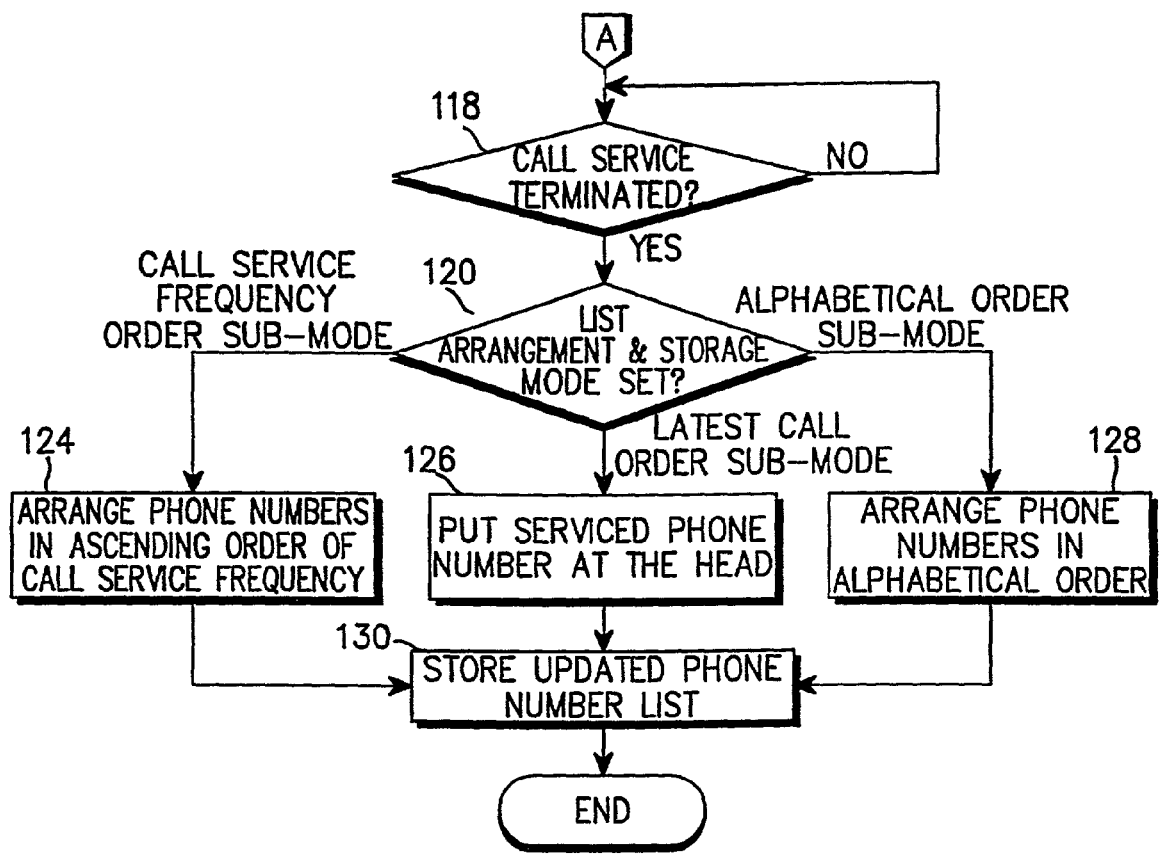
FIG. 11 is a flowchart illustrating a control operation for a phone number list arrangement and storage procedure in the speed dialing operations of FIG. 2 and FIGS. 5 to 9.

FIG. 2 is a flowchart illustrating a control operation for speed dialing in the controller 10 according to an embodiment of the present invention. FIG. 10 is a flowchart illustrating a control operation for setting the list arrangement and storage mode by the user according to the present invention, and FIG. 11 is a flowchart illustrating a control operation for arranging and storing a phone number list in the speed dialing operations shown in FIG. 2 and FIGS. 5 to 9.

Speed dialing in the above-constituted mobile phone according to the embodiment of the present invention will be described in detail with reference to FIGS. 1 to 4 and FIGS. 10 and 11. In the embodiment of the present invention, it is assumed that a plurality of phone numbers to be speedily dialed are stored at corresponding addresses in the memory 14.

The stored phone numbers are arranged in the memory 14 in the list arrangement and storage mode in the procedure shown in FIG. 10.

Referring to FIG. 10, the controller 10 determines whether a user has requested the list arrangement and storage mode to be set in step 800. If he has, the controller 10 enters the list arrangement and storage mode and displays the sub-modes of the list arrangement and storage mode on the display 16 in step 802. The list arrangement and storage sub-modes include a communication frequency order arrangement and storage sub-mode, a latest call order arrangement and storage sub-mode, and an alphabetical order arrangement and storage sub-mode. While the three sub-modes are set for the list arrangement and storage mode in the embodiment of the present invention, it is a mere exemplary application. Phone numbers can be arranged and stored in diverse ways, for example, in the order of mobile phone numbers, in the order of the local number of wired phone numbers, or in a similarity order. The user selects one of the list arrangement and storage sub-modes and sets the selected sub-mode. In step 806, the controller 10 determines whether the user has selected one of the sub-modes. If it does, the controller 10 arranges the stored phone numbers according to the selected list arrangement and storage sub-mode in step 808. Setting the list arrangement and storage mode advantageously increases convenience with which speed dialing can be performed. Storage of a plurality of phone numbers at each address in the memory is well known in this field, the description of which will be omitted.

Referring to FIG. 2, the controller 10 determines whether a speed dialing key has been input in step 100. Upon input of the speed dialing key, the controller 10 goes to step 104. The speed dialing key input can be implemented by pressing a digit key at an intended address for a predetermined period of time, or sequentially pressing a digit key and another specified key corresponding to the intended address, for example. If the speed dialing key has not been input, the controller 10 performs a normal operation in step 102.

Figure 4:
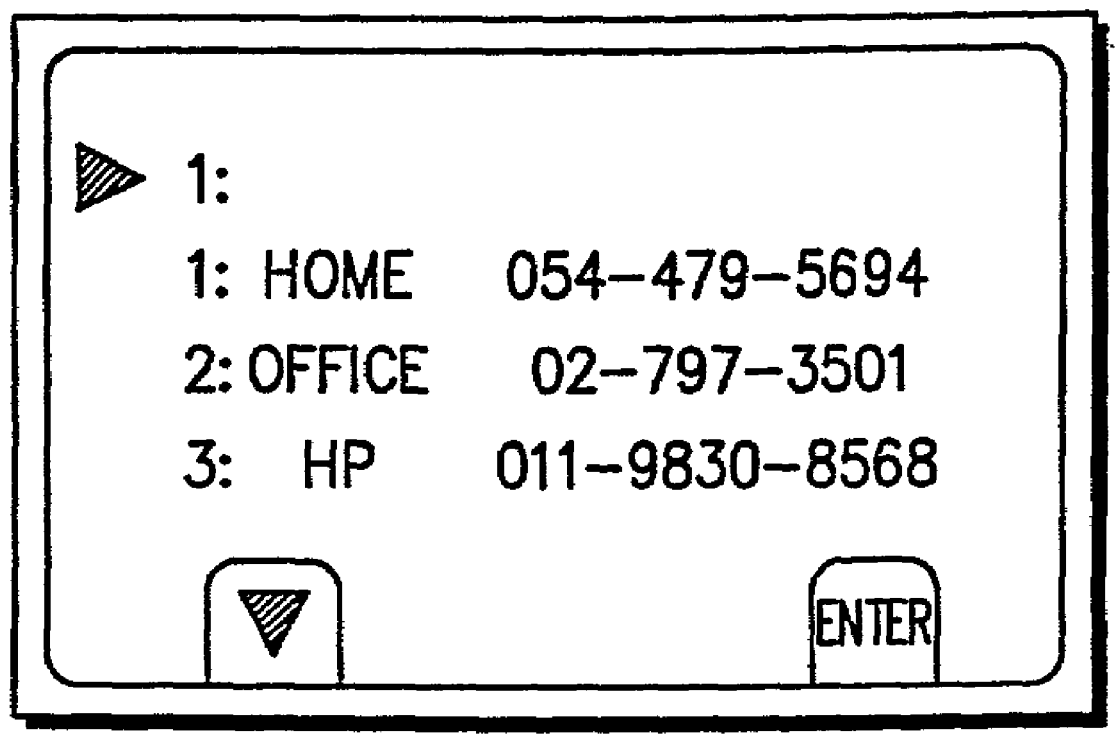
FIG. 4 illustrates a display example of phone numbers stored at a designated address, invoked by input of a speed dialing key according to the embodiment of the present invention.

In step 104, the controller 10 determines whether at least one phone number exists at an address indicated by the speed dialing key. If it does, the controller 10 goes to step 106. On the other hand, if no phone number exists at the address, the controller 10 returns to step 100. In step 106, the controller 10 counts the phone numbers at the address. If two or more phone numbers exist at the address, the controller 10 displays the phone numbers arranged according to the user-set list arrangement and storage mode on the display 16 in step 108. For example, if the user enters a digit key "1" for speed dialing, a plurality of phone numbers at the address "1" are displayed on the display 16 as shown in FIG. 4. FIG. 3 illustrates an address table listing one or more phone numbers stored at each address in the mobile phone according to the embodiment of the present invention and FIG. 4 illustrates a display example with a plurality of phone numbers at a designated address according to the embodiment of the present invention. Here, it is to be appreciated that the list arrangement and storage mode is not set nor applied to the phone numbers shown in FIG. 4.

Among the phone numbers displayed on the display 16, the user selects a desired phone number through the keypad 12. As shown in FIG. 4, the user can select a desired phone number using a directional keys or/and a digit key. In step 110, the controller 10 determines whether the user has selected a phone number. If he has, the controller 10 speedily dials the selected phone number in step 112 and provides a call service in step 116.

Meanwhile, if a single phone number exists at the designated address in step 106, the controller 10 displays the stored phone number on the display 16 and speedily dials the phone number in step 114 and then goes to step 116.

FIG. 11 is a flowchart illustrating a control operation for arranging the phone number serviced in step 116 together with other phone numbers according to the preset list arrangement and storage mode in the speed dialing operations shown in FIG. 2 and FIGS. 5 to 9 in the controller 10.

Referring to FIG. 11, the controller 10 determines whether the call service has been terminated in step 118. Upon termination of the call service, the controller 10 checks what is the preset list arrangement and storage sub-mode in step 120 and arranges the serviced phone number among other phone numbers according to the preset list arrangement and storage sub-mode in one of steps 124, 126, and 128. In step 130, the controller 10 stores the arranged phone number list.

Figure 7:
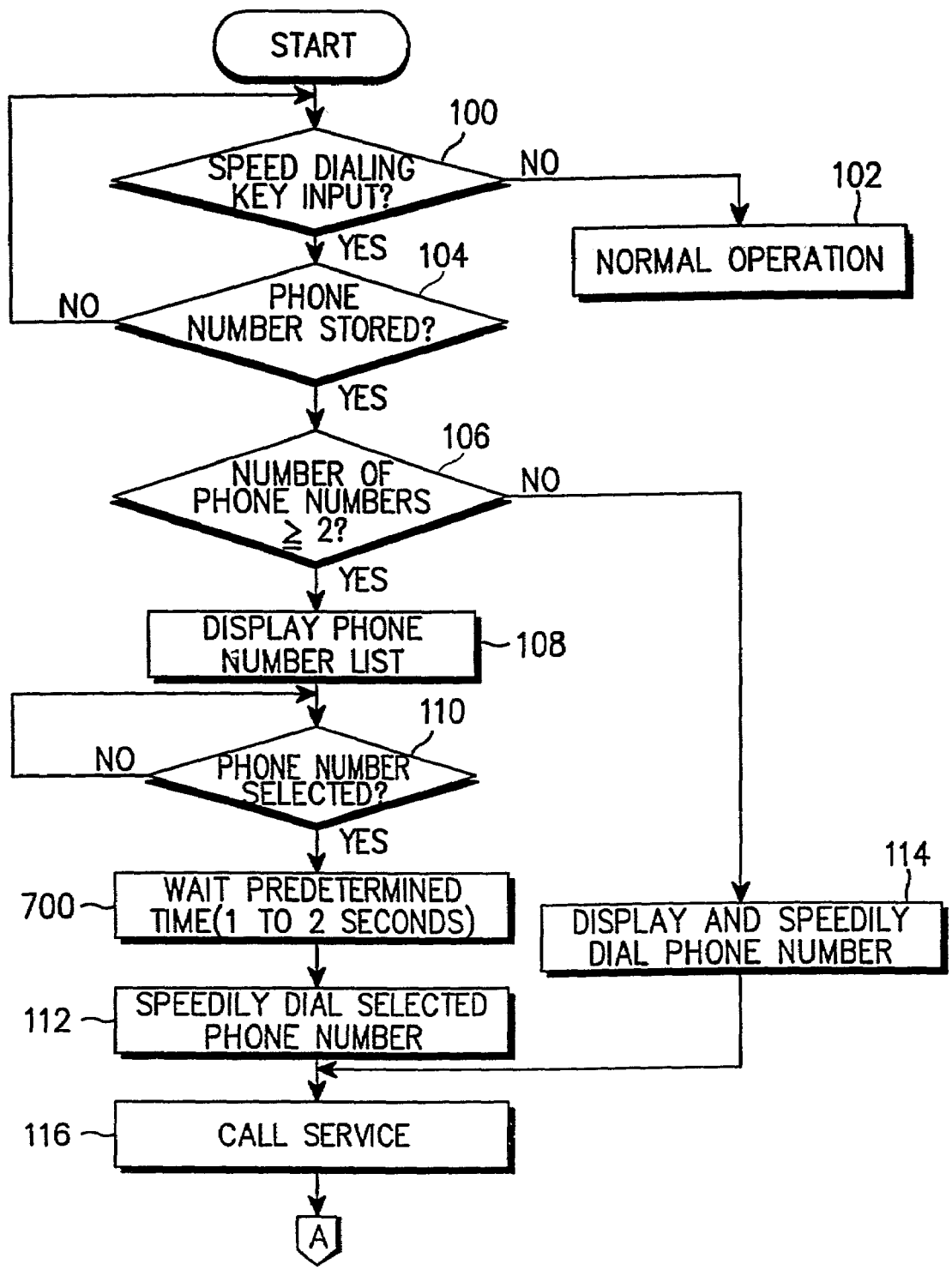
FIG.7 is a flowchart illustrating a control operation for speed dialing according to a fourth embodiment of the present invention.
Figure 8:
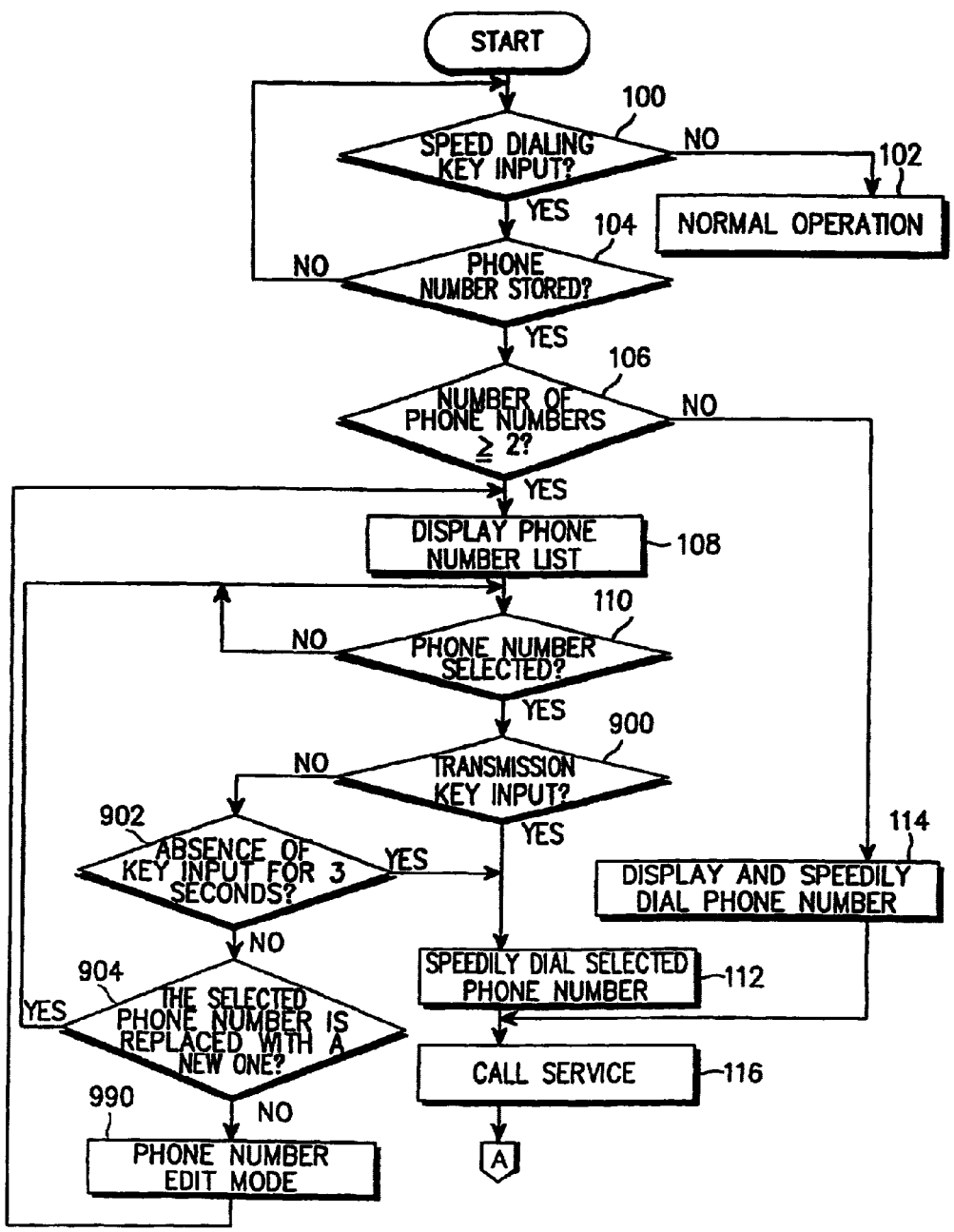
FIG. 8 is a flowchart illustrating a control operation for speed dialing according to a fifth embodiment of the present invention.
Figure 9:
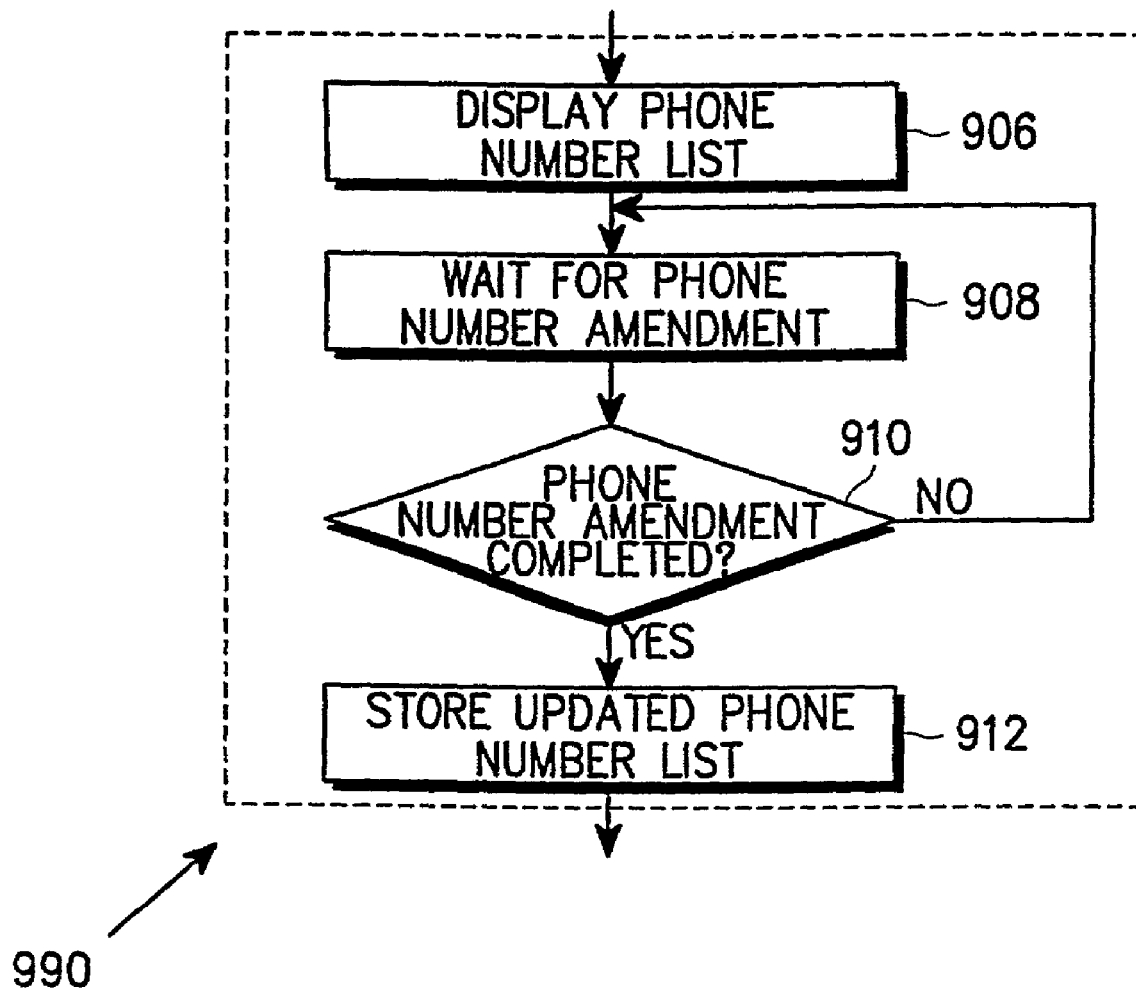
FIG. 9 is a flowchart illustrating a control operation for a phone number edit mode shown in FIG. 8.

FIGS. 5 to 9 are flowcharts illustrating speed dialing according to other embodiments of the present invention. These embodiments are the same as that shown in FIG. 2 except steps 500, 502, and 504 of FIG. 5, step 600 of FIG. 6, step 700 of FIG. 7, and steps 900, 902, 904, and 990 of FIG. 8. Thus, a description of the same steps is avoided. In addition, since FIG. 9 illustrates a detailed procedure of a phone number edit mode of step 900 of FIG. 8, it will be described later separately.

Figure 5:
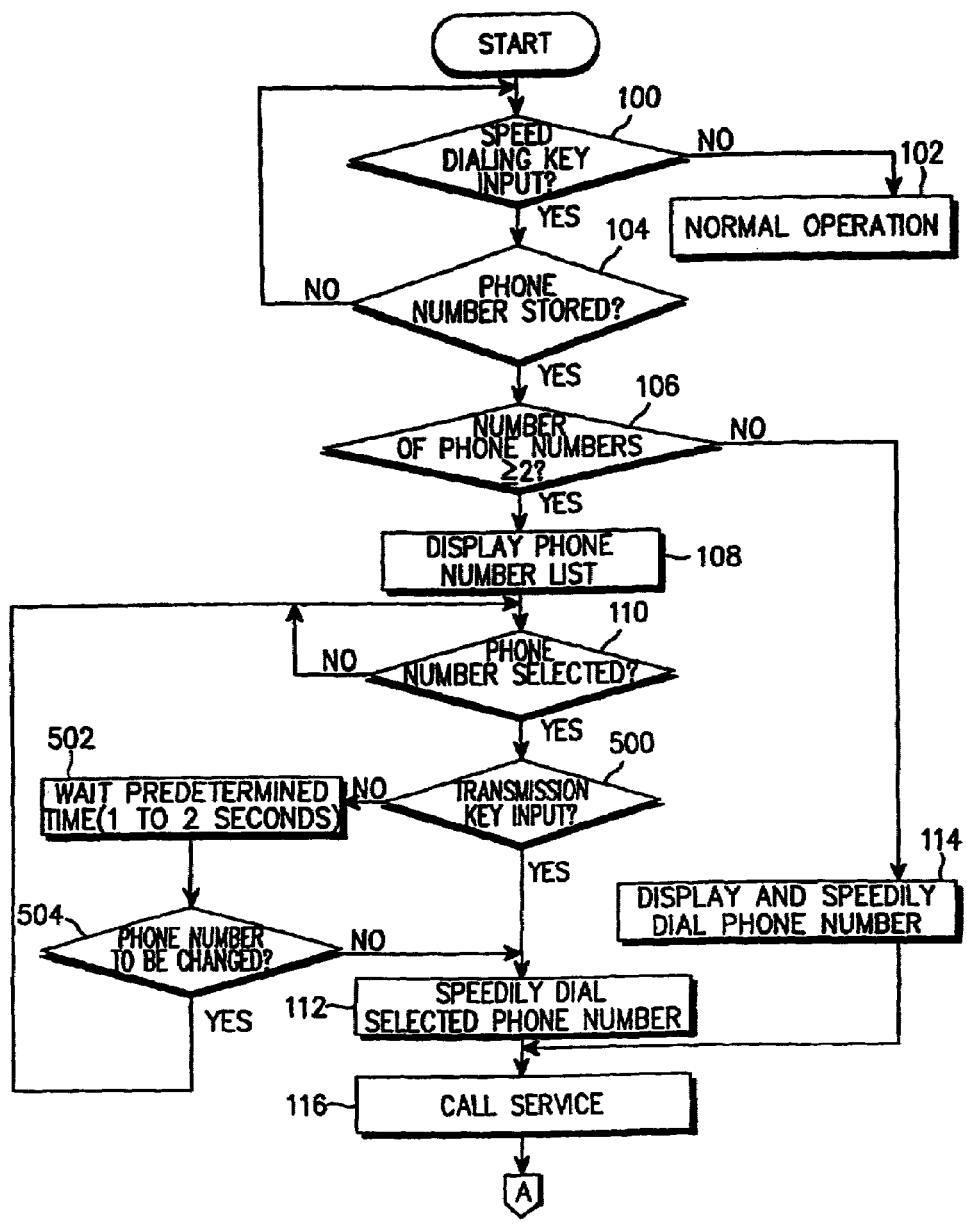
FIG. 5 is a flowchart illustrating a control operation for speed dialing according to another embodiment of the present invention.
Figure 6:
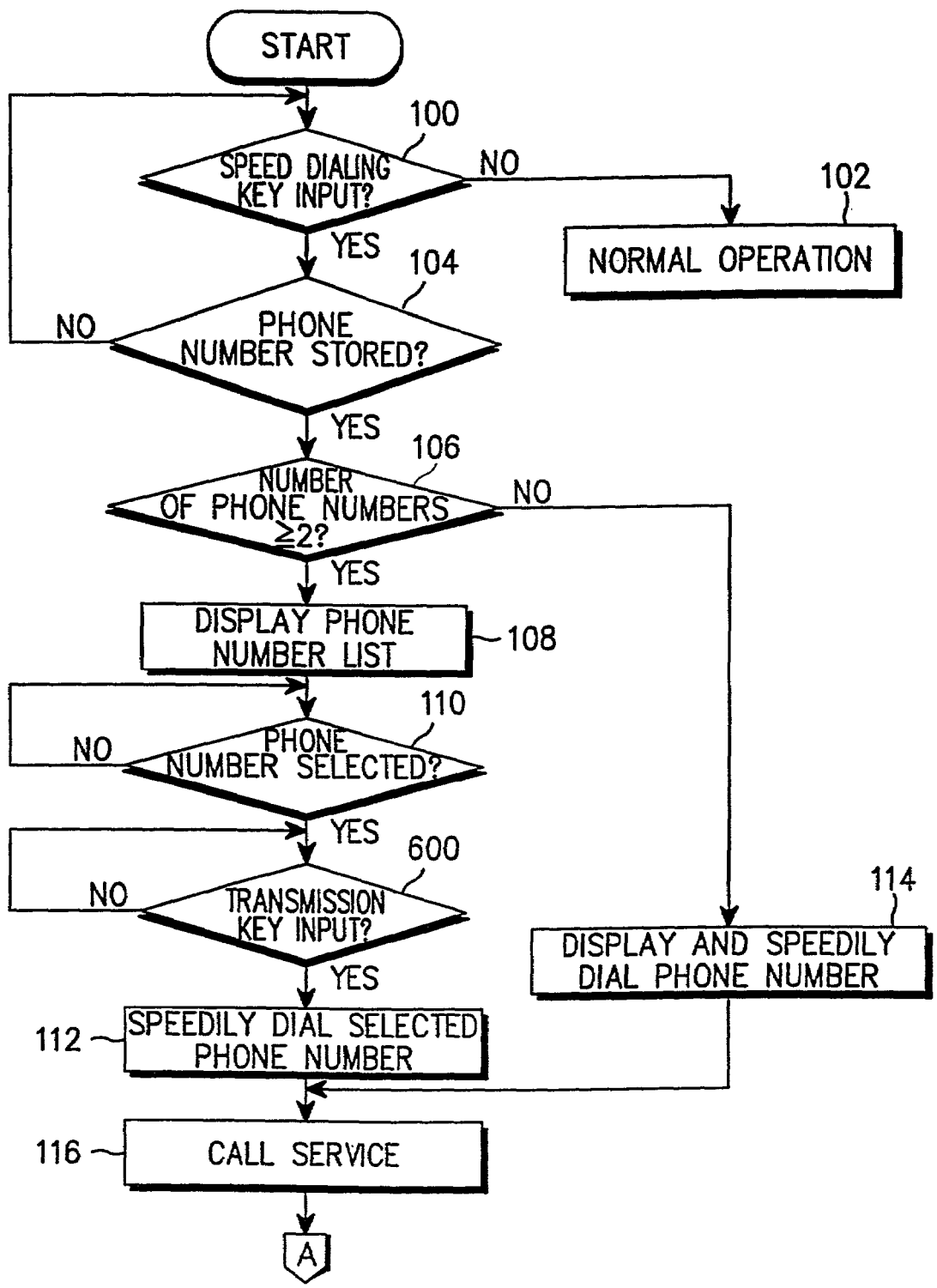
FIG. 6 is a flowchart illustrating a control operation for speed dialing according to a third embodiment of the present invention.

In addition to the steps shown in FIG. 2, FIG. 5 further includes key inputting and waiting steps, FIG. 6 further includes the key inputting step, FIG. 7 further includes the waiting step, FIG. 8 further includes the steps of key inputting, waiting, and a phone number edit mode shown in detail in FIG. 9.

Referring to FIG. 5, phone numbers at a designated address are displayed after being arranged and stored at the designated address according to the preset list arrangement and storage mode in step 108. When the user selects one of them in step 110, the controller 10 determines whether the user has pressed a transmission key in step 500. Upon input of the transmission key, the controller 10 speedily dials the selected phone number in step 112. Unless the controller 10 receives the key input, it waits for a predetermined time period to allow the user to change the selected number to another one or confirm the selected number in step 502. The predetermined time is preferably one to two seconds. In step 504, the controller 10 determines whether the selected phone number is changed to another one. If it is, the controller 10 returns to step 110. On the other hand, if the selected phone number is maintained, the controller 10 goes to step 112.

Referring to FIG. 6, the controller 10 determines whether the user has selected a phone number in step 110. Upon receipt of the phone number, the controller 10 determines whether the user has pressed a transmission key in step 600. Upon input of the transmission key, the controller 10 speedily dials the selected phone number in step 112.

Referring to FIG. 7, if the user has selected a phone number in step 110, the controller 10 waits for a predetermined time, for example, one or to seconds to allow the user to confirm the selected phone number in step 700 and speedily dials the selected number in step 112.

Referring to FIG. 8, phone numbers at a designated address are displayed after being arranged and stored at the designated address according to the preset list arrangement and storage mode in step 108. When the user selects one of them in step 110, the controller 10 determines whether the user has pressed a transmission key in step 900. Upon input of the transmission key, the controller 10 speedily dials the selected phone number in step 112. Unless the controller 10 receives the key input, it determines whether any key input has been received three seconds later in step 902. If there is no key input for three seconds, the controller 10 returns to step 112. If there is key input, the controller 10 goes to step 904. The key input can be the input of a digit key in the keypad 12. According to this embodiment, the digit key is input to add another phone number at an address where the selected phone number is stored, or change the phone number including the selected one.

In step 904, upon input of an up/down directional key, the controller 10 returns to step 110 to allow the user to replace the selected phone number with a new one. Meanwhile, the controller 10 goes to step 990 upon input of a left/right directional key or a digit key in step 904. The controller 10 edits the phone numbers at the address corresponding to the selected phone number in a phone number edit mode in step 990 and then returns to step 108.

Now a detailed description of the phone number edit mode of step 990 of FIG. 8 will be given with reference to FIG. 9.

Referring to FIG. 9, as the mobile phone is set to a phone number edit mode upon input of a left/right directional key or a digit key in step 904 of FIG. 8, the controller 10 displays a phone number list including the selected phone number in step 906. In step 908, the controller 10 waits for the user to change the phone numbers. When the user changes the phone numbers, the controller 10 determines whether the user has pressed a key indicating that the phone number change is completed in step 910. Upon input of the change complete key, the controller 10 stores changed phone numbers in step 912 and returns to step 108 of FIG. 8 so that the user can select an intended phone number from the updated phone number list.

In accordance with the present invention as described above, one of a plurality of phone numbers stored at an address can be selected for speed dialing. Due to the arrangement and storage of the plurality of phone numbers according to diverse list arrangement and storage modes and simplicity in editing a phone number list, an intended phone number is selected and speedily dialed more conveniently and more rapidly.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A speed dialing method in a mobile phone where a plurality of phone numbers are stored at a designated address in a memory, comprising the steps of:
   displaying the plurality of phone numbers at the designated address to a user upon input of a speed dialing key corresponding to the designated address;
   selecting one of the displayed plurality of phone numbers;
   determining whether a transmission key corresponding to the selected phone number has been pressed before speed dialing of the selected phone number;
   waiting a predetermined time before speed dialing the selected phone number; and
   speedily dialing the selected phone number or, if the user replaces the selected phone number with a new phone number in the predetermined time, speedily dialing the new phone number.

2. The speed dialing method of claim 1, further comprising the steps of:
   determining whether the user has requested a phone number list arrangement and storage mode to be set for the phone numbers stored at the designated address before the speed dialing key is input;
   requesting the user to select one of a communication frequency order arrangement and storage sub-mode, a latest call order arrangement and storage sub-mode, and an alphabetical order arrangement and storage sub-mode in the phone number list arrangement and storage mode upon request of setting of the phone number list arrangement and storage mode; and
   arranging and storing the phone numbers at the designated address according to a selected phone number list arrangement and storage sub-mode if the user selects one of the phone number list arrangement and storage sub-modes.

3. The speed dialing method of claim 1, further comprising the steps of:
   checking a phone number list arrangement and storage mode set by the user upon termination of a call service after speed dialing of the selected phone number; and
   arranging and storing the serviced phone number with the other telephone numbers at the designated address according to the phone number list arrangement and storage mode.

4. A speed dialing method in a mobile phone where at least one phone number is stored at a designated address in a memory, comprising the steps of:

determining whether only one phone number or a plurality of phone numbers is stored at the designated address upon input of a speed dialing key corresponding to the designated address;

displaying, if it is determined that a plurality of phone numbers is stored at the designated address, the plurality of phone numbers to a user upon input of a speed dialing key corresponding to the designated address;

selecting a phone number from among the displayed plurality of phone numbers;

waiting a predetermined time the allow a user to select a new phone number;

speedily dialing the finally selected phone number; and displaying, if it is determined that only the at least one phone number is stored at the designated address, the at least one phone number and speedily dialing the at least one phone number, wherein each called party is assigned a designated address at which the plurality of phone numbers are stored.

5. The speed dialing method of claim 4, further comprising the steps of:

checking a phone number list arrangement and storage mode set by the user upon termination of a call service after speed dialing of the selected phone number; and arranging and storing the serviced phone number at the designated address according to the phone number list arrangement and storage mode.

6. A speed dialing method in a mobile phone where at least one phone number is stored at a designated address in a memory, comprising the steps of:

determining whether a plurality of phone numbers or only one phone number is stored at the designated address;

displaying, if it is determined that a plurality of phone numbers is stored at the designated address, the plurality of phone numbers in a call service frequency order, updated after termination of a last service call;

displaying, if it is determined that only the at least one phone number is stored at the designated address, the at least one phone number to a user upon input of a speed dialing key corresponding to the designated address;

selecting by the user the at least one phone number or one of the displayed plurality of phone numbers;

waiting a predetermined time to allow a user the select another number; and speedily dialing the selected phone number after the predetermined time has elapsed, wherein each called party is assigned a designated address at which the plurality of phone numbers are stored.

7. The speed dialing method of claim 6, further comprising the steps of:

checking a phone number list arrangement and storage mode set by the user upon termination of a call service after speed dialing of the selected phone number; and arranging and storing the serviced phone number at the designated address according to the phone number list arrangement and storage mode.

8. A speed dialing method in a mobile phone where a plurality of phone numbers are stored at a designated address in a memory, comprising the steps of:

determining whether there is a phone number stored at the designated address upon input of a speed dialing key corresponding to the designated address;

counting the phone numbers stored at the designated address;

displaying the phone numbers to a user if the number of phone numbers is at least two;

selecting one of the displayed phone numbers by the user;

determining whether a transmission key corresponding to the selected phone number has been received;

speedily dialing the selected phone number upon input of the transmission key;

performing a phone number edit mode upon input of a phone number edit key for the selected phone number within a predetermined time; and displaying an edited phone number list on a display, wherein each called party is assigned a designated address at which the plurality of phone numbers are stored.

9. The speed dialing method of claim 8, further comprising the steps of:

determining whether a key indicating a phone number change has been input before entering the phone number edit mode; and selecting one of the stored phone numbers upon input of the phone number change key.

10. A speed dialing method in a mobile phone where a plurality of phone numbers are stored at a designated address in a memory, comprising the steps of:

determining whether there is a phone number stored at the designated address upon input of a speed dialing key corresponding to the designated address;

counting the phone numbers stored at the designated address;

displaying the phone numbers to a user if the number of phone numbers is at least two;

selecting one of the displayed phone numbers by the user;

speedily dialing the selected phone number a predetermined time later;

performing a phone number edit mode upon input of a phone number edit key for the selected phone number within a predetermined time; and displaying an edited phone number list on a display.

11. A speed dialing method in a mobile phone where a plurality of phone numbers are stored at a designated address in a memory, comprising the steps of:

determining whether there is a phone number stored at the designated address upon input of a speed dialing key corresponding to the designated address;

counting the phone numbers stored at the designated address;

displaying the phone numbers to a user if the number of phone numbers is at least two;

selecting one of the displayed phone numbers by the user;

speedily dialing the selected phone number upon input of a transmission key or at a predetermined time later;

determining whether a phone number edit key has been input for the selected phone number within a predetermined time;

selecting one of the phone numbers upon input of the phone number edit key;

performing a phone number edit mode upon input of the phone number edit key for the selected phone number within a predetermined time; and displaying an edited phone number list on a display.

12. The speed dialing method of claim 11, further comprising the steps of:

checking a phone number list arrangement and storage mode set by the user upon termination of a call service after speed dialing of the selected phone number; and arranging and storing the serviced phone number in the phone number list according the phone number list arrangement and storage mode.

* * * * *